Dec. 23, 1924.

W. R. PURNELL

INDOOR GAME OF GOLF

Filed Feb. 6, 1923     3 Sheets-Sheet 1

1,520,081

Inventor
W. R. Purnell
by
*F. A. Witherspoon*
Attorney.

Dec. 23, 1924.  
W. R. PURNELL  
INDOOR GAME OF GOLF  
Filed Feb. 6, 1923

| HOLE | Driver | Brassie | Mid-Iron | Mashie | Mashie-Niblick | Niblick | Putter 1st Put. | Putter 2nd Put. |
|---|---|---|---|---|---|---|---|---|
| 1 | 100 YDS. Straight. Topped. Looked up. | 75 YDS. Hooked badly. | 50 YDS. Straight. Took too much turf. | 25 YDS. Topped. Looked up. | 25 YDS. Took too much turf. | 10 YDS. Hooked badly. | 0 SHOOT AGAIN. Missed red circle to left. 1st put again. | Holed out. |
| 2 | 125 YDS. Sliced badly. | 100 YDS. Medium slice. | 100 YDS. Medium hook. | 75 YDS. Medium hook. | 50 YDS. Medium slice. | 10 YDS. Straight. | 5 Over-ran red circle. 1st put again. | Holed out. |
| 3 | 150 YDS. Medium hook. | 150 YDS. Straight. Rolling shot, stops in any rough or sand trap. | 100 YDS. Straight. | 100 YDS. Straight. | 60 YDS. Straight. | 20 YDS. Straight. | 10 Red circle. | Stopped on lip of cup. |
| 4 | 175 YDS. Straight. | 150 YDS. Straight. | 125 YDS. Straight. | 125 YDS. Straight. | 75 YDS. Straight. | 50 YDS. Straight. | 20 Red circle. | Holed out. |
| 5 | 200 YDS. Straight. | 200 YDS. Straight. | 150 YDS. Straight. | 140 YDS. Straight. | 90 YDS. Straight. | 30 YDS. Straight. | 20 Red circle. | Holed out. |
| 6 | 250 YDS. Straight. Extra long shot. | 225 YDS. Straight. Perfect shot. | 200 YDS. Straight. Extra long shot. | 150 YDS. Straight. Excellent shot. | 100 YDS. Straight. | 40 YDS. Straight. Beautiful shot. | 30 Holed out in one. | Rimmed the cup. Put again. |
| 7 | 225 YDS. Straight. | 200 YDS. Straight. | 175 YDS. Straight. | 140 YDS. Straight. | 90 YDS. Straight. | 30 YDS. Straight. | 25 Red circle. | USE SINGLE DIE FOR 2ND PUT. |
| 8 | 175 YDS. Straight. | 175 YDS. Straight. | 150 YDS. Straight. | 125 YDS. Straight. | 75 YDS. Straight. | 50 YDS. Straight. | 30 Red circle. | |
| 9 | 150 YDS. Medium slice. | 150 YDS. Straight. Bouncing shot catches any sand trap in path. | 125 YDS. Straight. | 110 YDS. Straight. | 60 YDS. Straight. | 20 YDS. Straight. | 20 Red circle. | |
| 10 | 125 YDS. Hooked badly. | 100 YDS. Medium hook. | 100 YDS. Medium slice. | 75 YDS. Medium slice. | 50 YDS. Medium hook. | 10 YDS. Straight. | 50 Red circle. | |
| 11 | 75 YDS. Straight. Hit ground behind ball. | 50 YDS. Straight. Topped. Looked up. | 50 YDS. Straight. Loose grip. | 25 YDS. Sliced badly. Toe of club hit ground. | 25 YDS. Sliced badly. | Dubbed. Shoot again with niblick. | 0 SHOOT AGAIN. Hit ground back of ball. 1st put again. | PUTTER MAY BE USED IF BALL IS ON FAIRWAY WITHIN 10 YDS. OF GREEN AND HAS A CLEAR RUN TO HOLE. THE STROKE WILL BE COUNTED AS THE 1ST PUT. |
| 12 | | | | | | USE THIS COLUMN WHEN IN TRAP ALONGSIDE GREEN, OR IN ROUGH WITHIN 10 YDS. OF GREEN. | | |

Fig. 2

W. R. Purnell  
Inventor  
by F. A. Witherspoon  
Attorney

Dec. 23, 1924.  
W. R. PURNELL  
INDOOR GAME OF GOLF  
Filed Feb. 6, 1923
1,520,081
3 Sheets-Sheet 3
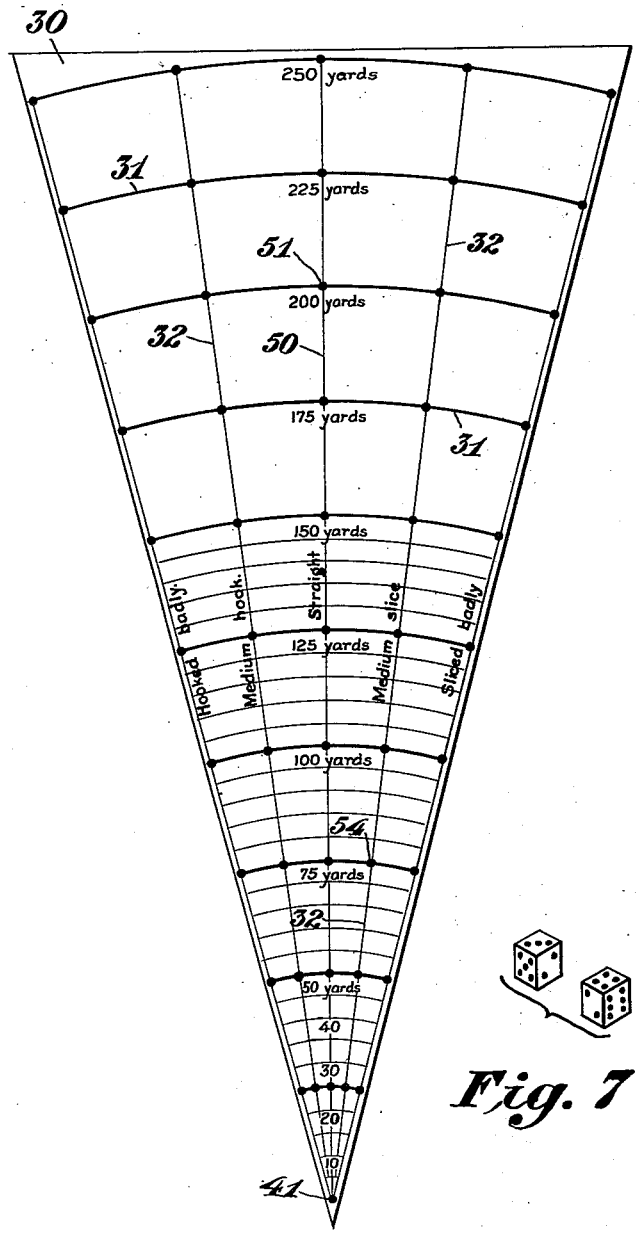
Fig. 3
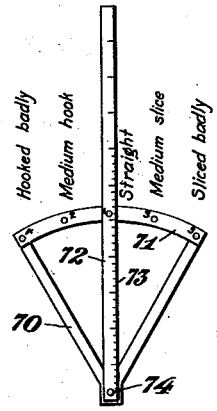
Fig. 4
Fig. 5
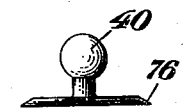
Fig. 6
Fig. 7
W. R. Purnell  
Inventor  
by F. A. Witherspoon  
Attorney Patented Dec. 23, 1924.

1,520,081

UNITED STATES PATENT OFFICE.

WILLIAM REYNOLDS PURNELL, OF THE UNITED STATES NAVY.

INDOOR GAME OF GOLF.

Application filed February 6, 1923. Serial No. 617,374.

*To all whom it may concern:*

Be it known that I, WILLIAM R. PURNELL, a lieutenant commander in the United States Navy, and a citizen of the United States, at present attached to the U. S. S. Wyoming, have invented certain new and useful Improvements in Indoor Game of Golf; and I do hereby declare the following to be a full, clear, and exact description of the invention, such as will enable others skilled in the art to which it appertains to make and use the same.

This invention relates to an apparatus whereby the game of golf may be played indoors, and has for its object to provide a device which will be comparatively inexpensive to manufacture, as well as one that will require skill to play and provide more amusement than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 2 is a plan view of a board ruled to represent the distance traveled by and the direction of the ball when struck by one of the clubs listed thereon;

Figure 3 is a plan view of a scale used to measure the distance and direction covered by the said struck ball;

Figure 4 is a modification of the measuring scale shown in Figure 3;

Figures 5 and 6 are a plan view and elevation respectively of one of the ball markers or men, used in playing the game; and Figure 7 is a perspective view of a pair of dice.

Figure 1:
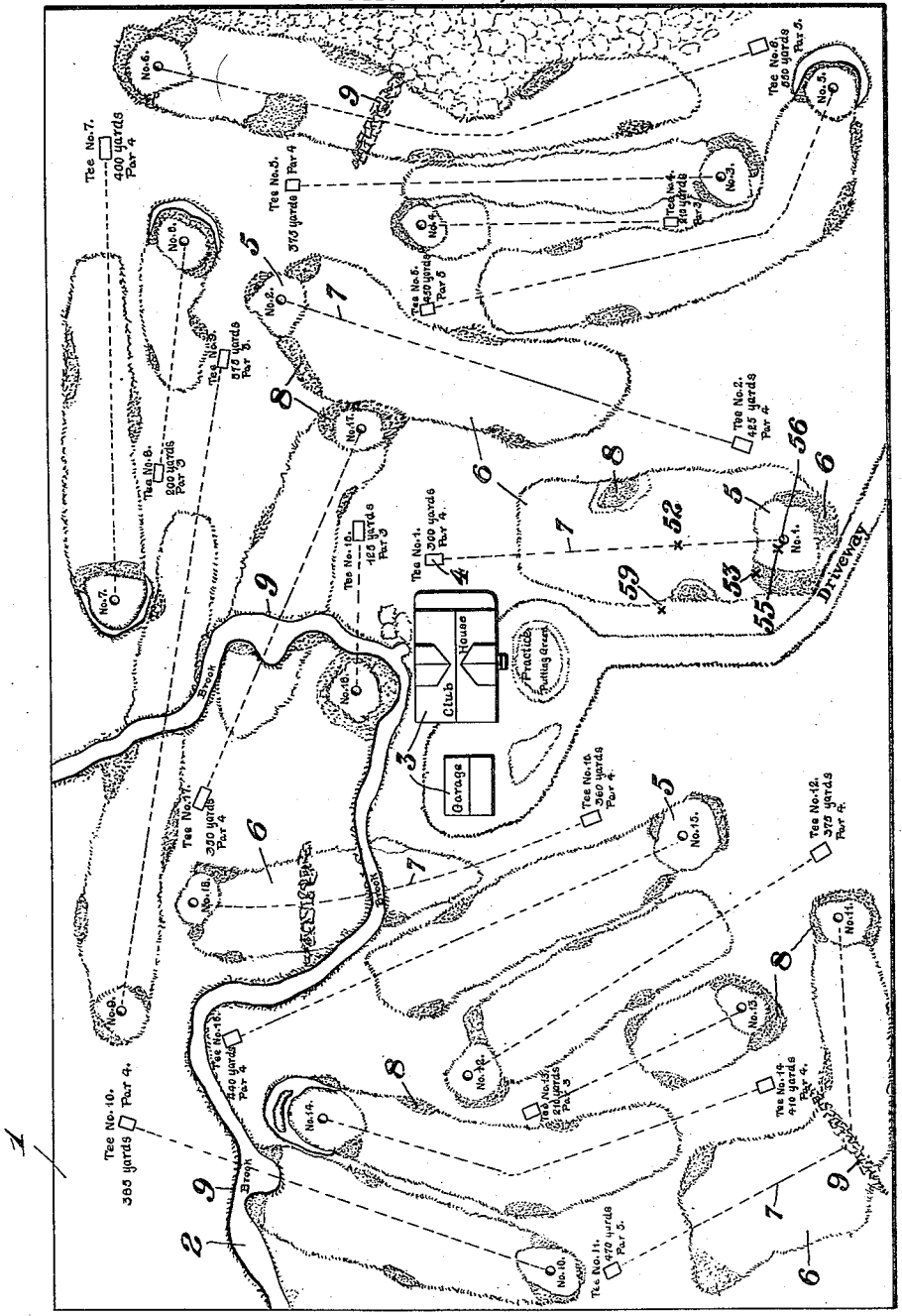
Figure 1 is a plan view of a board provided with a diagram of a golf course having eighteen holes, with the usual appurtenances.

Referring first to Figure 1, 1 indicates a landscape diversified by natural and artifical objects such as a brook 2, buildings 3, etc., and 4 indicates the first tee of the golf course. The succeeding tees are designated as "tee No. 2", "tee No. 3", etc., up to and including "tee No. 18". Likewise, the eighteen holes are successively designated "No. 1", "No. 2", etc., up to and including hole "No. 18", and around each hole is a putting green 5. 6 represents the fairway and 7 the center of said fairway, as indicated by the dotted line connecting the tee and its corresponding hole. 8 indicates a sand trap or rough, while 9 represents a hazard which may be natural or otherwise.

The legends at each tee, such, for example, as "300 yds. Par. 4", at tee No. 1, are to inform the players of the game respectively of the distance from that tee to its corresponding hole, and the number of strokes required by a skilful player to drive the ball from the tee to and into the hole. Thus a skilful player would require four strokes to drive the ball over the 300 yds. between tee No. 1 and hole No. 1.

The game may be played by one or more persons, as is the case in actual golf, and the plays of this game will be governed as are the strokes or plays of the real game, by the rules, instructions, etiquette, etc., of golf, a book of which may be furnished with this device. The means by which this game is played comprise a pair of dice, shown in Figure 7, a club or control card 13, see Figure 2, a measuring scale 30 as shown in Figure 3, and a ball marker or man 40 shown in Figures 5 and 6.

Referring now to Figure 2, it will be observed that the club or control card 13 is ruled to form vertical and horizontal columns or divisions, the first vertical column, headed "Throw", containing the various totals which may be obtained as a result of throwing a pair of dice. The remaining vertical columns, represent the clubs and are headed "Driver", "Brassie", "Mid-Iron", etc., to correspond to the clubs of the same names, used in the actual game of golf. The last column headed "Putter", is sub-divided into two columns 60 and 61 headed "1st Put" and "2nd Put" respectively, and the latter, it will be observed, is further divided to supply a column of figures each figure of which represents a possible throw of the single die used on the second put; all as will be clear from the drawing.

In Figure 3 is shown a scale 30 which is to be applied to the game board 1, to measure the distance traveled by the ball, as well as the degree of deflection from the straight line from the initial position of said ball and the objective point or the hole. The said scale 30 which may be made of any suitable material, transparent or otherwise, has drawn thereon the concentric arcs 31 intersected by the radial lines 32, which latter are to measure the deflection referred to above. That is to say, in making a shot should the ball be not properly or squarely hit with the club it will not travel in a straight line toward the objective point, but will deflect or curve to either the right or the left. If this deflection is to the right, it is called a "slice", whereas if it is to the left it is termed a "hook". In this indoor game of golf these "hooks" and "slices" are applied through the medium of the said scale 30, Figure 3, and are indicated as shown by two divisions, each, viz, "medium" and "badly."

In playing this indoor game we may suppose that the ball is on tee No. 1, Figure 1, in the actual game, and that the player is using a driver club. In the indoor game, he would throw his pair of dice, and let us suppose that the dice show the two and the four spots, thus making a total of six. The indoor player would look on his card corresponding to Figure 2, and he would see that in the first column opposite the numeral 6, under the heading "Driver", there is the legend "200 yds. straight". This means that the ball in the actual game would have gone down the center 7 of the fairway 6, and stopped at a point thereon from tee No. 1 at a distance of 200 yards. In the indoor game, this distance has to be measured on the board 1, and if the player employs the scale shown in Figure 3, he would place the zero point 41 on tee No. 1, and measure down the "straight" line 50 until he got to the point 51, indicating 200 yards. Of course, it will be understood that the scale on which Figure 3 is drawn is much larger than is the scale on which Figure 1 is drawn, but in the indoor game, the scales of the instrument 30 shown in Figure 3 and of the miniature game in Figure 1 would be the same. These two scales being the same, a measurement on the line 7 in Figure 1, for a distance of 200 yards would locate the ball at about the point 52. Now suppose that the indoor player selects the "mashie" for his next club and throws his dice again, and that the five and six spots turn up, making eleven in all. Turning to Figure 2, under the column headed "Mashie", and opposite the number 11, we find the legend "75 yds. medium slice". This means that the ball when properly measured from the point 52 on the diagram shown in Figure 1 would be located somewhere about the point 53 on Figure 1, which is in the "rough" 6.

It should be said in making this measurement, the point 41 of the instrument 30 shown in Figure 3 would be placed upon the point 52, and the indoor player would follow along the line 32 of said instrument until he got to the point 54 indicating 75 yards, and this said point 54 would locate the point 53 in Figure 1, all as will be readily understood. Of course, it will be further understood in all of these measurements that the straight line 50 of the instrument 30 will in every case connect the position of the ball with the hole toward which one is driving, so that the other radial lines such as 32 would indicate the angle the ball has departed from said straight line.

The ball now having been located at the point 53, Figure 1, the player may be supposed to take up the "niblick" club. His throw may be further supposed to be the spots 2 and 4 on the dice, which would make a total of six, and opposite 6 in the throw column, the player would pass along the horizontal lines until he got to the legend "30 yards straight", under the niblick column. This would by the measurements on the instrument 30 shown in Figure 3, locate the ball at about the point 55 in close proximity to hole No. 1. The indoor player would now naturally choose the "putter" club, and upon throwing his dice, let us suppose that he throws a 3 and a 6 spot, making a total of 9. Upon consulting the card 13, shown in Figure 2, under the putter column, opposite 9, one reads the legend "Red circle". This means that the ball has landed somewhere about the edge of the hole, let us suppose at the point 56. This position of course requires no measurement from the card 30 and the player would proceed to throw his dice again, and to count under the column headed "2nd put". Let us suppose that the single die he throws shows a four spot, which is opposite the legend "holed out". This means that the ball has entered the hole No. 1.

Referring more particularly to column 57, under the niblick title in Figure 2, and to the legend 58 below said column 57, it will be understood that should in a previous shot the ball have landed in a trap alongside the green 5 or in a rough within 10 yards of said green, then the distance will be applied as taken from column 57. That is to say, suppose in the first shot the player, instead of having landed the ball at the point 52, had landed it at the point 59, in the rough. The player in this case would now select the niblick club, and throw his dice. Suppose this throw shows spots totalling 11. In column 57 opposite this number 11 in the "Throw" column is the member 50 and in the column 80 is the legend "10 yards straight". But the legend 58 at the bottom of the niblick columns 80 and 57 should be followed, because of the peculiar location of the ball at said point. That is, the 50 in column 57 should be counted and not the 10 yards in column 80.

It will be also observed that at the bottom of the two columns 60 and 61, under the heading "Putter" in Figure 2, there is a legend 62 reading as follows: "Putter may be used if ball is on fairway within 10 yards of green and has a clear run to hole. The stroke will be counted as the first put." This means that if the ball as measured by the instrument 30 shown in Figure 3 is located at some point such as 53, on the rough in the fairway which is within 10 yards of the green 5, and if it has a clear run to hole, then the putter club may be used, or rather, the column 60 will be used in playing the indoor game, and the stroke will be counted as if it had been made by the first put. In fact, when the ball was driven from the point 53 to the point 55, this rule was observed.

It will be observed that at the top of the column 60, under the "putter" division, there is the legend "Missed red circle to left, 1st put again." This legend 81 means that upon this stroke, the ball has traveled to the left of the red circle which surrounds each hole, and therefore, the ball is to be brought back to its initial position, and hit again. That is to say, this stroke counts as a miss, and the player "first puts" again.

At the bottom of said column 60, there is another legend 82 reading as follows: "Hit ground back of ball. 1st put again." This means that the club, instead of hitting the ball squarely, hit the ground first, back of the ball, and as a result thereof, projected the ball but a very slight distance. In this case, as heretofore, the stroke counts as a miss, and the player "first puts" again.

The game will be continued from hole to hole throughout the entire eighteen holes, according to the principles above disclosed, and of course the party who finishes the game in the least number of plays wins out. That is, after the ball has entered hole No. 1 in the manner above disclosed, it is removed in the real game and placed on tee No. 2, whereupon it is driven from said tee toward hole No. 2. In this indoor game, after the ball has been located in hole No. 1, as above disclosed, it is supposed to rest on tee No. 2, and the indoor player chooses his club such as the "driver," "brassie," "mashie," etc., and throws his dice, whereupon the ball is located on the fairway 6 extending between tee No. 2 and hole No. 2, in the manner above disclosed until it reaches hole No. 2, and so on for all the subsequent fairways.

Coming now to the modified form of measuring device 70, illustrated in Figure 4, it is composed of a sector shaped member 71, provided with the straight member 72, provided with a scale 73, and pivoted as at 74. The sector shaped member is provided with a plurality of divisions as illustrated, each division carrying legends such as "hooked badly," "medium hook," "straight," "medium slice," and "sliced badly." It will be observed that these said legends are repetitions of the legends found in the instrument 30 shown in Figure 3, and which correspond to the radial lines lettered 32 in said figure. In other words, in using this said instrument 70, the pivot 74 corresponds to the zero point 41 on Figure 3, and said pivot is located on the position in Figure 1 the ball occupies before the shot is made, whereupon the scaled member 72 is swung along the sector shaped member 71, until it corresponds to the proper legend determined from the club card 13, such as "hooked badly," etc., and then the new position the ball is to occupy is scaled off on the member 72. In this way, the ball is located in the same manner and by substantially the same means as it is located when using the instrument 30.

It should be mentioned that each time the ball is located on the chart 1 a marker 40 is placed at the point determined upon, and one of its points such as 76 is employed to locate accurately the exact position of the ball. A separate ball marker is used for each player and they are differently numbered to identify the balls for each player.

This game may be played, of course, with regular dice, and the chance involved in the throw of the same will lend zest to the game. On the other hand, if desired, one of the dice may be made somewhat loaded so that it will not fall as does the other die. The player therefore by practicing on this said loaded die can use greater or less skill in bringing a given number uppermost. That is to say, suppose the ball to be located at the point 52 in Figure 1, and the player wishes to make another straight shot along the center 7 of the fairway. He could look under the column "Mashie" in Figure 2, and see that opposite the number 5 in the throw column, there is the legend "125 yds. straight." He might believe that he could very probably throw a two spot with his loaded die, and therefore, he would take a chance on throwing the three spot with the die that is not loaded, and thus would he endeavor to throw a five spot shot which would give him 125 yards straight, and enable him to "hole out" sooner.

It will now be clear that the indoor player may observe all the rules of an outdoor game, and that he will have not only the element of chance to chain his attention, but he will also be enabled to use a greater or less amount of skill in playing this indoor game.

What is claimed is:

1. In an indoor game apparatus, the combination of a miniature golf course having representations of teeing ground, putting greens, holes and hazards; a control card provided with columns corresponding to the various clubs used in the outdoor game of golf and each column having a division designating each possible play of its corresponding club; a scale device comprising a sector-shaped frame and a measuring arm pivoted thereto, said device adapted to locate on said miniature course the position the ball is to occupy according to each of said divisions; and a die adapted to be thrown to determine from said control card which division is to govern the position of the ball on said course after each play.

2. In an indoor game apparatus, the combination of a miniature golf course having representations of teeing ground, putting greens, holes and hazards; a control card provided with columns corresponding to the various clubs used in the outdoor game of golf and each column having a division designating each possible play of its corresponding club; a scale device comprising a sector-shaped frame and a measuring arm pivoted thereto, said device adapted to locate on said miniature course the position the ball is to occupy according to each of said divisions; a die adapted to be thrown, to determine from said control card which division is to govern the position of the ball on said course after each play; and a marker adapted to be applied to said course to locate said position after it has been determined.

In testimony whereof I affix my signature.

WILLIAM REYNOLDS PURNELL.